US008800049B2

(12) United States Patent  
Michaelis et al.

(10) Patent No.: US 8,800,049 B2  
(45) Date of Patent: Aug. 5, 2014

(54) LICENSING AND CERTIFICATE DISTRIBUTION VIA SECONDARY OR DIVIDED SIGNALING COMMUNICATION PATHWAY

(75) Inventors: Paul Roller Michaelis, Louisville, CO (US); David S. Mohler, Arvada, CO (US); Douglas W. Swartz, Lakewood, CO (US); Roger L. Toennis, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 919 days.

(21) Appl. No.: 12/548,271

(22) Filed: Aug. 26, 2009

(65) Prior Publication Data

US 2011/0055555 A1 Mar. 3, 2011

(51) Int. Cl.  
 *G06F 21/00* (2013.01)

(52) U.S. Cl.  
 USPC ............. 726/26; 726/30; 713/155; 713/156; 709/228; 380/279

(58) Field of Classification Search  
None  
See application file for complete search history.

(56) References Cited

U.S. PATENT DOCUMENTS

| | | | |
|---|---|---|---|
| 5,537,447 A | 7/1996 | Urbansky | |
| 5,619,514 A | 4/1997 | Smith | |
| 5,745,425 A | 4/1998 | Anderson et al. | |
| 5,859,882 A | 1/1999 | Urbansky | |
| 5,920,507 A | 7/1999 | Takeuchi et al. | |
| 6,141,788 A | 10/2000 | Rosenberg et al. | |
| 6,170,075 B1 | 1/2001 | Schuster et al. | |
| 6,173,403 B1 * | 1/2001 | DeMont | 713/185 |
| 6,243,836 B1 | 6/2001 | Whalen | |
| 6,260,071 B1 | 7/2001 | Armistead et al. | |
| 6,381,645 B1 | 4/2002 | Sassin | |
| 6,434,590 B1 | 8/2002 | Blelloch et al. | |
| 6,434,606 B1 | 8/2002 | Borella et al. | |
| 6,452,950 B1 | 9/2002 | Ohlsson et al. | |
| 6,460,140 B1 * | 10/2002 | Schoch et al. | 726/22 |
| 6,650,637 B1 | 11/2003 | Bansal et al. | |
| 6,674,745 B1 * | 1/2004 | Schuster et al. | 370/352 |
| 6,690,675 B1 | 2/2004 | Kung et al. | |
| 6,763,226 B1 | 7/2004 | McZeal, Jr. | |
| 6,769,027 B1 | 7/2004 | Gebhardt et al. | |
| 6,823,047 B1 | 11/2004 | Cruickshank | |
| 6,845,129 B2 | 1/2005 | Golin | |
| 6,862,298 B1 | 3/2005 | Smith et al. | |

(Continued)

FOREIGN PATENT DOCUMENTS

CN 1914851 2/2007  
DE 10211740 10/2003

(Continued)

OTHER PUBLICATIONS

Gurock, Dennis and Tobias, "Selecting the Right License Strategy for Your Software", printed on Jul. 25, 2009, from the Internet at http://blog.gurock.com/articles/selecting-the-right-license-strategy-for-your-software, 6 pages.

(Continued)

*Primary Examiner* — Nadia Khoshnoodi  
*Assistant Examiner* — Robert Leung  
(74) *Attorney, Agent, or Firm* — Sheridan Ross P.C.

(57) ABSTRACT

In one embodiment, the present invention is directed to the use of separate communication pathways over different types of networks to handle bearer and control signaling in connection with a license transaction.

20 Claims, 3 Drawing Sheets

(56) References Cited

U.S. PATENT DOCUMENTS

| | | | |
|---|---|---|---|
| 6,879,582 B1 | 4/2005 | Dhara et al. | |
| 6,914,964 B1 | 7/2005 | Levine | |
| 6,977,948 B1 | 12/2005 | Chennubhotla et al. | |
| 7,203,193 B2 | 4/2007 | Hoof | |
| 7,215,959 B2 | 5/2007 | Creamer et al. | |
| 7,293,176 B2 | 11/2007 | Otway et al. | |
| 7,352,766 B2 | 4/2008 | Van Asten et al. | |
| 7,359,979 B2 | 4/2008 | Gentle et al. | |
| 7,385,985 B2 | 6/2008 | Narsinh et al. | |
| 7,386,115 B2 | 6/2008 | Peters | |
| 7,418,002 B2 | 8/2008 | Robotham et al. | |
| 7,496,750 B2 | 2/2009 | Kumar et al. | |
| 7,626,994 B2 | 12/2009 | Bennett | |
| 7,627,097 B2 | 12/2009 | Kawabata et al. | |
| 7,702,947 B2 | 4/2010 | Peddada | |
| 7,779,482 B1 * | 8/2010 | Yen et al. | 726/30 |
| 2001/0028634 A1 | 10/2001 | Huang et al. | |
| 2002/0073208 A1 | 6/2002 | Wilcock et al. | |
| 2002/0101853 A1 | 8/2002 | Siegrist et al. | |
| 2003/0120541 A1 * | 6/2003 | Siann et al. | 705/14 |
| 2003/0163328 A1 | 8/2003 | Rambo et al. | |
| 2003/0198218 A1 | 10/2003 | Farris et al. | |
| 2004/0057445 A1 | 3/2004 | LeBlanc | |
| 2004/0076190 A1 | 4/2004 | Goel et al. | |
| 2004/0120309 A1 | 6/2004 | Kurittu et al. | |
| 2004/0233898 A1 | 11/2004 | Otsuka et al. | |
| 2005/0074008 A1 | 4/2005 | Herledan et al. | |
| 2005/0076334 A1 * | 4/2005 | Demeyer | 717/177 |
| 2005/0080746 A1 * | 4/2005 | Zhu et al. | 705/59 |
| 2005/0094618 A1 | 5/2005 | Colban et al. | |
| 2005/0249146 A1 | 11/2005 | Pinault et al. | |
| 2006/0007915 A1 | 1/2006 | Frame | |
| 2006/0062371 A1 | 3/2006 | Vanderheiden et al. | |
| 2006/0083199 A1 | 4/2006 | Yang | |
| 2006/0126667 A1 | 6/2006 | Smith et al. | |
| 2006/0140221 A1 | 6/2006 | Yamada et al. | |
| 2006/0166716 A1 | 7/2006 | Seshadri et al. | |
| 2006/0191016 A1 * | 8/2006 | Ostergren et al. | 726/27 |
| 2006/0203805 A1 | 9/2006 | Karacali-Akyamac et al. | |
| 2006/0233158 A1 | 10/2006 | Croak et al. | |
| 2006/0251051 A1 | 11/2006 | Bhatt et al. | |
| 2006/0256772 A1 | 11/2006 | Yarlagadda | |
| 2006/0277051 A1 | 12/2006 | Barriac et al. | |
| 2007/0026852 A1 | 2/2007 | Logan et al. | |
| 2007/0081460 A1 | 4/2007 | Karacali-Akyamac et al. | |
| 2007/0110034 A1 | 5/2007 | Bennett | |
| 2007/0112681 A1 * | 5/2007 | Niwano et al. | 705/59 |
| 2007/0147399 A1 | 6/2007 | Deng et al. | |
| 2007/0150294 A1 * | 6/2007 | Rusman et al. | 705/1 |
| 2007/0167156 A1 | 7/2007 | Hundal | |
| 2007/0177579 A1 | 8/2007 | Diethorn et al. | |
| 2007/0183323 A1 | 8/2007 | Hannu et al. | |
| 2007/0211704 A1 | 9/2007 | Lin et al. | |
| 2007/0223467 A1 | 9/2007 | Makiuchi et al. | |
| 2007/0280428 A1 | 12/2007 | McClelland | |
| 2007/0291733 A1 | 12/2007 | Doran et al. | |
| 2008/0002689 A1 | 1/2008 | Vera | |
| 2008/0013528 A1 | 1/2008 | Miller et al. | |
| 2008/0165708 A1 | 7/2008 | Moore et al. | |
| 2008/0187108 A1 | 8/2008 | Engelke et al. | |
| 2008/0205377 A1 | 8/2008 | Chao et al. | |
| 2008/0232353 A1 | 9/2008 | Vafin et al. | |
| 2008/0232442 A1 | 9/2008 | Rodbro et al. | |
| 2008/0240004 A1 | 10/2008 | Shaffer et al. | |
| 2008/0285599 A1 | 11/2008 | Johansson et al. | |
| 2008/0298336 A1 | 12/2008 | Gollamudi | |
| 2008/0298349 A1 | 12/2008 | Beightol et al. | |
| 2008/0310398 A1 | 12/2008 | Jain et al. | |
| 2009/0074012 A1 | 3/2009 | Shaffer et al. | |
| 2009/0119779 A1 * | 5/2009 | Dean et al. | 726/26 |
| 2009/0213837 A1 | 8/2009 | Ku et al. | |
| 2009/0234940 A1 | 9/2009 | Pal et al. | |
| 2009/0235329 A1 | 9/2009 | Chavez et al. | |
| 2010/0165857 A1 | 7/2010 | Meylan et al. | |

FOREIGN PATENT DOCUMENTS

| | | |
|---|---|---|
| DE | 102006027708 | 2/2008 |
| EP | 0152251 | 8/1985 |
| EP | 1471708 | 10/2004 |
| EP | 1515506 | 3/2005 |
| EP | 1681844 | 7/2006 |
| EP | 1729490 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

U.S. Appl. No. 12/406,784, filed Mar. 18, 2009, Michaelis, et al.
U.S. Appl. No. 12/486,605, filed Jun. 17, 2009, Michaelis, et al.
U.S. Appl. No. 12/430,697, filed Apr. 27, 2009, Michaelis, et al.
U.S. Appl. No. 12/426,023, filed Apr. 17, 2009, Michaelis, et al.
U.S. Appl. No. 12/433,334, filed Apr. 30, 2009, Brinkmann, et al.
U.S. Appl. No. 12/361,950, filed Jan. 29, 2009, Michaelis, et al.
U.S. Appl. No. 12/371,065, filed Feb. 13, 2009, Michaelis, et al.
Azuri, "Edgewater Networks, Inc. Announces Extension of VoIP Failover Capabilities at the Enterprise Edge", http://74.125.95.104/search?q=cache:JgCKutpPN7gJ:voipservices.tmcnet.com/feature/article, Nov. 16, 2007, printed on Dec. 3, 2008, pp. 1-3.
Counterpath Corporation; "Network Convergence Gateway (NCG)", Internet Article printed on Nov. 25, 2008 from http://www.counterpath.com/network-convergence-gateway-ncg.html; 2 pages.
"Indepth: Jitter", VoIP Troubleshooter website, available at http://www.voiptroubleshooter.com/indepth/jittersources.html, accessed on Oct. 22, 2009, pp. 1-8.
Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.
Webopedia; What is jitter buffer?—A Word Definition for the Webopedia Computer Dictionary; printed from http://www.webopedia.comITERM/J/jitter_buffer.html on Mar. 10, 2009; 6 pages.
Wikipedia; "Network switching subsystem"; Internet Article printed on Feb. 6, 2009 from http://en.wikipedia.org/wiki/Home_Location_Register; 10 pages.
Wikipedia; "Subscriber Identity Module"; Internet Article printed on Feb. 6, 2009 from http://en.wikipedia.org/wiki/Subscriber_Identity_Module; 8 pages.
Wikipedia; Jitter—From Wikipedia, the free encyclopedia; printed from http://en.wikipedia.org/wiki/Jitter on Mar. 10, 2009; 6 pages.
Wikipedia "H.323", http://en.wikipedia.org/w/index.php?title=H.323&printable=yes, Dec. 18, 2008, 14 pages.
Wikipedia "RTP Control Protocol"; http://en.wikipedia.org/w/index.php?title=RTP_Control_Protocol< . . . Jan. 9, 2009, 3 pages.
Wikipedia "Voice over Internet Protocol"; http://en.wikipedia.org/wiki/Voice_over_Internet_Protocol Jan. 23, 2009, 15 pages.
Wikipedia "H.245"; http://en.wikipedia.org/wiki/H.245 Nov. 9, 2009, 1 page.
Official Action with English Translation for China Patent Application No. 201010265351.7, dated Jul. 17, 2013 14 pages.

* cited by examiner

LICENSING AND CERTIFICATE DISTRIBUTION VIA SECONDARY OR DIVIDED SIGNALING COMMUNICATION PATHWAY

FIELD

The invention relates generally to session management and particularly to coordination of licensing session management over plural heterogeneous networks.

BACKGROUND

To protect software manufacturers' copyrights in software sold to the public, manufacturers commonly license software to the purchaser. Additionally, in many applications the purchaser has elected to pay only for certain features of software which must be selectively enabled by the manufacturer. An ongoing problem in the art is to prevent unlawful or unlicensed use of software; that is, the problem is to prevent software from being pirated and used on unauthorized hardware and/or otherwise authorized customers from actuating features for which the customer has not paid. Another ongoing problem is how to distribute electronically software while avoiding denial-of-service, man-in-the-middle and other forms of attack.

A number of methods have been developed to protect against unauthorized use of software and/or attacks.

In one method, a key is required to enable the software. This solution does not solve the copying problem because the key is normally printed on the packaging of the software, and anyone can install the software as many times as they wish, however illegal it may be.

In yet another method, a special piece of hardware or "dongle" is used. The dongle is a special piece of hardware that connects to the serial or parallel port of the computer. The software running on the computer sends a random number to the dongle. The dongle performs a secret computation (hereinafter a "feature-based computation result") and returns a result. The software makes a like computation; if the two computations match, the software continues to run. To work satisfactorily, the response must include feature and version information. While protecting against attacks by hackers, the use of the dongle is cumbersome when it fails. In the event that the dongle fails, the system is down until a new dongle can be physically obtained on site. Also, once made the dongle is fixed. If it was used for feature activation, a new dongle is required for each additional feature that is purchased.

A further method is to freely distribute CD-ROM disks. When the CD-ROM is inserted into a computer, the computer automatically connects to a remote server via the Internet or a dial-up connection to receive a machine-specific key. Alternatively, the key is stored on the CD ROM. The key unlocks the software so that it can be utilized on that computer. The remote server can also obtain the necessary payment information from the computer user. This method does not function well for a certain types of software since it does not provide for the authorization to use different features of the same software application nor is it dependent on the version of the software being requested. In addition, it does not provide the necessary authorization of personnel to make such a request and fails to protect against attacks by hackers.

Another method requires the software, upon installation or first execution, to record serial number information (e.g., medium access control or MAC address) regarding predetermined hardware components of the computer system and/or a unique identifier generated from transient target computer state information, which is/are included in an electronic license. Using the information collected by the target computer, the licensing server generates and provides the license to the target computer. An ongoing problem is how to exchange the collected information and license in a secure manner.

Other methods are to distribute software and/or license information in encrypted form or via an encrypted session and/or to require the user to maintain a data connection with the vendor while using the licensed software. A problem arises, however, in distributing the encryption key in a secure manner. When the key is provided to the customer, the customer can provide the software to others along with the key, thereby permitting widespread piracy of the software. Requiring the user to upload potentially sensitive data to the vendor site introduces security concerns.

Another problem in software licensing is maintaining control of software in an enterprise environment. Numerous enterprise licensing methods are in use, including fixed licenses (which permit an application to execute only on certain designated computers) and floating licenses (which permit a certain number of applications to execute, at any one time, only on a limited number of computers). In the latter method, one common licensing scheme uses a fixed set of licenses controlled by a license server maintained by a vendor. The license information is maintained in a license database along with information regarding which applications are in use and how many units are still available. When an application is required, it commences running. Code embedded in the application initially requests a license or license validation from the server to facilitate the execution of the application. The server checks the license database and, when an appropriate number of licenses are available, grants the request. As requests are received and licenses granted, the relevant information is logged into a file to track usage of various applications. Because the computer, to execute, must contact the licensing server over an untrusted network, security remains a concern.

Another problem in software licensing is permitting licensing transactions through partially disabling firewall protection, thereby compromising the security of the local area network. Malicious code can be introduced by an attacker more easily through the compromised security gateway.

To address security concerns, quantum cryptography has been developed. Quantum cryptography is a form of cryptography that employs quantum properties of photons to exchange a random key over a public channel with perfect secrecy. Quantum cryptography has a number of cost and practical limitations.

SUMMARY

These and other needs are addressed by the various embodiments and configurations of the present invention. The present invention is directed generally to the use of separate communication pathways over different types of networks to handle bearer and control signaling in connection with a license transaction.

In a first embodiment, a method includes the steps:

(a) establishing, over a second communication pathway, a second session between a customer computational component to be licensed and a licensing server, the second communication pathway being over the Internet;

(b) establishing, over a first communication pathway, a first session between a customer and the licensing server, the first communication pathway being over a digital telephone network;

(c) transmitting, by a processor, first license information over the first communication pathway; and (d) transmitting, by a processor, second license information over the second communication pathway, wherein the first and second license information permit the customer computational component to execute.

In another embodiment, a licensing server includes a processor operable to:

establish, over a second communication pathway and by a second communication modality, a second session with a customer computational component to be licensed;

establish, over a first communication pathway and by a first communication modality, a first session with a customer, the first and second communication modalities being different;

transmit and/or receive first license information over the first communication pathway; and transmit and/or receive second license information over the second communication pathway, wherein the first and second license information permit the customer computational component to execute.

In yet another embodiment, a computational component includes:

a software application to be licensed; and
a processor operable to:
establish, over a second communication pathway and by a second communication modality, a second session with a customer computational component to be licensed;
establish, over a first communication pathway and by a first communication modality, a first session with a customer, the first and second communication modalities being different;
transmit and/or receive first license information over the first communication pathway; and
transmit and/or receive second license information over the second communication pathway, wherein the first and second license information permit the software application to execute.

In one configuration, the first license information includes a digital certificate to authenticate the computational component. The licensing server includes a certificate authority.

In one configuration, separation of session control signaling and bearer communications is used for license and/or certificate distribution. The media or content is sent via the Internet along with a wrapper or install shield that uses cryptographic information and license and license/certificate distribution via the PSTN. All of the license/certificate and cryptographic information and key are sent via the PSTN or, alternatively, are split in a large variety of ways between the Internet and PSTN. Preferably, the facts that there is another connection modality and that the loading of the license and/or certificates are being done separate from the media or content is hidden from the customer or end-user. One can make the install wrapper or shield (typically transferred with the content or media) apparent or simply indicate that a system update is in progress depending on which is more appropriate to the content/media and security needs.

In another configuration, signaling and bearer for license/certificate and cryptographic algorithm or key are separated between any two communication modalities not using the same network. Radio Frequency ("RF") versus wired, Internet versus PSTN, and the like are possibilities. One of ordinary skill in the art will appreciate that other combinations are possible. In such a case, at least some of the critical cryptographic information is sent via the more secure channel, e.g., wired or wireless PSTN or RF link, rather than via the Internet.

In yet another configuration, periodic license/certificate renewal and management is done using the same dual communication modality method. This includes downloads of additionally licensed features and/or updates to those license/certificates originally sent.

In still another configuration, tamper alert messages are sent via the signaling communication mode (e.g., via the PSTN).

The present invention can provide a number of advantages depending on the particular configuration. By way of example, the invention can provide a secure methodology for preventing unauthorized distribution of licensed software and hardware. As shown by the principles of Quantum cryptography, the use of different modes of communication can dramatically improve security. The use of two separate modes can be automated and therefore seamless to the user. Since the transmission of license information is bifurcated between signaling and bearer channels, the effectiveness of any attack is compromised. The mechanism can leverage the existing North American Numbering Plan ("NANP") and the International Telephony Union's ("ITU") E.164 standard to represent a reliable and regulated "communication session" identification and control mechanism that is re-purposed for use in conjunction with Internet-based licensing transactions. Existing telephony protocols permit both control signaling and media information to be transmitted. The mechanism can provide control signaling to each endpoint in a licensing transaction without undue increases in packet latency, as would be introduced by virus inspecting security applications. The invention can avoid selective disablement of security gateway by permitting many licensing transactions to be performed over the PSTN. This is particularly true for ongoing licensing checks performed after the initial license is obtained by the customer. The invention can provided added benefits by moving the point of divergence of the first and second communication pathways to the customer's computational component and licensing server.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "communication modality" refers to a communication pathway over a type of network. Different types of networks involve not only different protocols but also differing levels of security. For example, one network type is the PSTN, another network type is a radio frequency network (such as a cellular network), another network type is the Internet, and so on.

The term "communication pathway" refers to a unidirectional or bidirectional connection between network nodes. A communication pathway may have one or more channels.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "license information" refers to any information exchanged as part of a licensing transaction involving, for example, a software application to be licensed, software updates, features, and/or modifications. License information includes, without limitation, the install shield or wrapper, the license, license certificate, PKI certificates, symmetric or asymmetric encryption keys and other cryptographic information, transient state information to be used in key generation, or serial number(s) collected from a computational component, software activation keys (to activate licensed software and/or the install shield), license validation keys (to validate a license), a feature-based computation result, license validation queries and/or responses, license tracking information, and permissions to execute licensed software in a fixed or floating license scheme.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
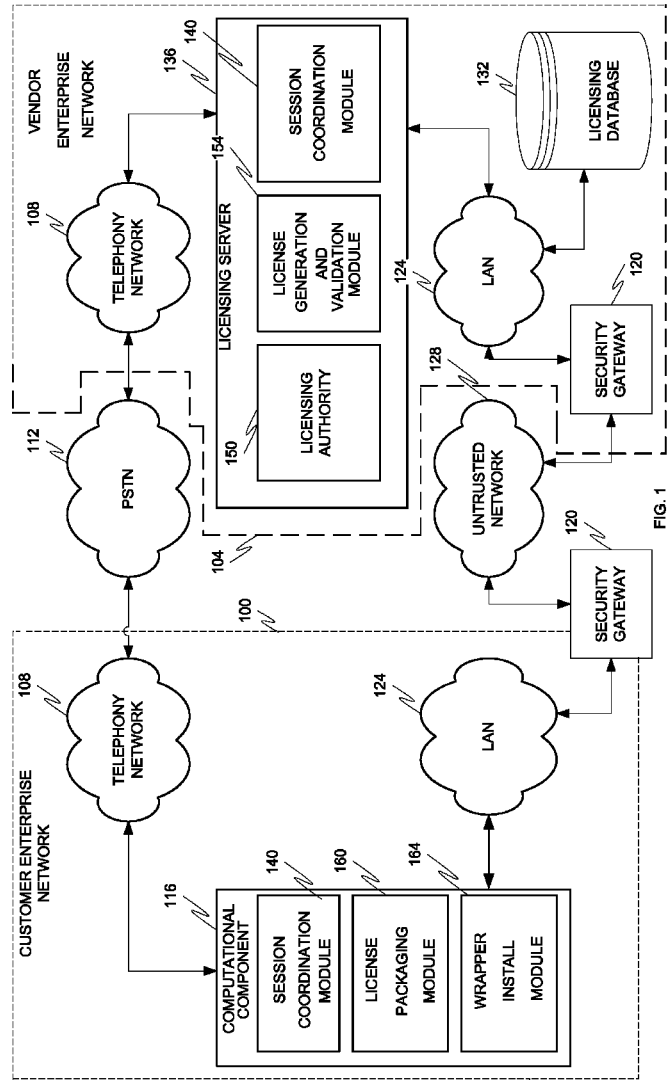
FIG. 1 is a block diagram of a network architecture according to an embodiment.

FIG. 1 depicts a network architecture according to one embodiment. The architecture includes customer and vendor enterprise networks 100 and 104 separated by an un-trusted network 128 (which is a packet-switched wide area un-trusted or public distributed processing or data network such as the Internet) and a digital telephone network 112 (such as a cellular network and/or the Public Switched Telephone Network ("PSTN")). The customer enterprise network 100 includes a customer computational component 116, a security gateway 120, a LAN (or trusted network) 124 interconnecting the computational component 116 and security gateway 120, and a telephony network 108. The vendor enterprise network 104 includes a security gateway 120, licensing server 136, and a licensing database 132, all interconnected by LAN 124, and a telephony network 108. Although the customer is described with reference to an enterprise network, it is to be understood that the teachings of the invention apply equally to an individual consumer as the customer.

The dotted lines 100 and 104 surrounding each of the local area networks and its nodes indicate the De-Militarized Zone ("DMZ"), or demarcation zone or perimeter network. As will be appreciated, the DMZ is a physical or logical sub-network that contains or exposes an organization's external services to a larger, un-trusted network, such as the Internet. It provides an added layer of security to the organization's local area network, whereby an external attacker only has access to equipment in the DMZ rather than the entire local area network. Any service provided to external users in an external network are placed in the DMZ, particularly web servers, mail servers, FTP servers, VoIP servers, and DNS servers.

The computational component 116 is a packet-switched device, such as a personal computer, laptop, personal digital assistant, wired or wireless communication device, and other device for presenting information to and receiving input from a subscriber to the customer enterprise network 104. Preferably, the computational component 116 is able to engage in both voice and non-voice communication methods. More preferably, the computational component 116 is equipped with a web browser. Exemplary communication devices include 9610 and 9620™ IP telephones, and IP Softphone™ of Avaya, Inc., operating on a personal computer, laptop or notebook computer.

The security gateways 120 allow or control access to a network. The gateway, also called a protocol converter, is equipped for interfacing with another network that uses different protocols. The gateway can contain devices such as protocol translators, impedance matching devices, rate converters, fault isolators, and signal translators, as necessary, to provide system interoperability. The gateway can further include security applications, such as a firewall configured to permit, deny, encrypt, decrypt, or proxy all computer traffic between different security domains based upon a set of rules and other criteria. The gateway 120 may, or may not, be configured to pass control signalling or bearer traffic and further may, or may not, be user reconfigurable in response to commands received over the respective LAN 124.

The licensing server 136 is a software-controlled computing device that is responsible for controlling and managing licensing of customer computational components 116 and/or software applications executing on the computational components 116. Although licensing is hereinafter discussed with reference to a computational component described as hardware, it is to be understood that the teachings of the present invention apply equally to licensing software applications on the computational component. The licensing server 136 includes, in computer readable memory, a licensing authority 150 to supervise licensing functions, including authentication, target computational component information collection, key generation, and activities on the target computational component (such as software and license installation), a license generation and validation module 154 to generate new licenses and validate new and existing licenses, and a session coordination module 140 to create, associate, manage, and coordinate simultaneous and/or sequential sessions over the PSTN 112 and untrusted network 128.

The licensing database 132 includes licensing information for multiple customers and licensed computational components. The licensing information includes customer-identification and license fields. The license fields typically include, in the case of a computational component, a serial number that must be present on a component of the computational component for the license to be valid and the computational component to operate (e.g., a serial number of a processor in the computational component must be in the license file), a name, model number, and/or version of the licensed computational component, data network (electronic) address of the computational component, telephone network (electronic) address of the computational component 116 or a wired or wireless voice communication device associated with the customer enterprise, and identifications and capacities of licensed features.

To interact with the licensing server 136, the computational component 116 includes, in computer readable memory, a session coordination module 140, a licensing packaging module 160 to receive, from the licensing server 136, license information and package the information into a valid license and a wrapper install module 164 to interact with the licensing authority 150, locally supervise installation of licensed software (if any), and interact with a customer representative. The interaction includes providing feedback to the representative or user and coordinating the exchange of license information over the PSTN 112 and untrusted network-enabled sessions, certificate exchange, key exchange, and license information collection from the target computational component 116. One or more of the session coordination module 140, license packaging module 160, and wrapper or install shield 164 (hereinafter "wrapper install module) can be provided with the computational component 116, with the software to be installed on the computational component 116 (such as when the software is on removable memory media), or by being pushed by or pulled from the licensing server 136 over the PSTN 112, the untrusted network 128, or a combination thereof.

The telephony networks 108 can include a variety of components for establishing wireless and or wired digital telecommunication connections, including one or more telephone trunk (multiple phone) lines, media servers, switches (e.g., a PBX), wireless telephone network access points such as AP-7™ and AP-8™ from Avaya, Inc., media gateways (such as the G150™, G250™, G350™, G450™, G600™, G650™, G700™, and the G860™ port networks and the Integrated Gateway™ from Avaya, Inc.).

The session coordination modules 140 typically effect session creation, management, and coordination for modem-enabled PSTN communication pathway and/or for a selected telecommunication method over a wireless telephone or cellular network. In one exemplary configuration, the module 140 transmits, over a PSTN-enabled communication session between the computational component 116 and licensing server 136, session security information for the untrusted network 128 (e.g., security protocols and encryption parameters (symmetrical or asymmetrical encryption/decryption keys and encryption algorithms) to be used), authentication information (e.g., digital certificates), and license information (e.g., transient state information (to be used in key generation) or serial number(s)) collected from the computational component 116, software activation keys (to activate licensed software or the install wrapper), license validation keys (to validate a license), a feature-based computation result, license validation queries and responses, license tracking information, and permissions to execute licensed software in a fixed or floating license scheme, and the like. To provide enhanced levels of security, the licensing modules exchange the license packaging and/or wrapper install modules, licenses and other types of license information, and/or licensed software over both the PSTN 112 and untrusted network-enabled session communication pathways. In other words, a first portion of license-related data is transferred over a first (circuit-switched or PSTN-enabled) network communication pathway and a second portion of license related data is transferred over a second (packet-switched or untrusted network-enabled) network communication pathway.

Session coordination is performed by pairing the telephone address associated with the computational component 116 and/or customer enterprise network 100 with an IP address associated with the computational component 116. As will be appreciated, the telephone numbers are defined by a suitable standard, such as the North American Numbering Plan ("NANP") and the International Telephony Union's ("ITU") E.164 standard. Using the pairing of telephone address/IP address for each endpoint, first signals for a first session over a first communication pathway can be associated by the computational module 140 with second signals over a second communication pathway.

In one configuration, the telephone number/IP address pairing is determined by converting the telephone address into a corresponding IP address according to the Electronic NUMbering ("ENUM") protocol (or ITU E.164 standard). The ENUM protocol from the IETF converts a telephone number to an IP address and vice versa so that it can be resolved by the Internet's DNS system like traditional Web site domains. For example, the fully qualified telephone number 1-215-555-1234 would turn into 4.3.2.1.5.5.5.5.1.2.1.e164.arpa. The digits are reversed because DNS reads right to left (the top level domain such as .com in a URL is read first). ENUM records can hold attributes about a device such as whether it can receive a text message or is Internet capable.

Figure 2A:
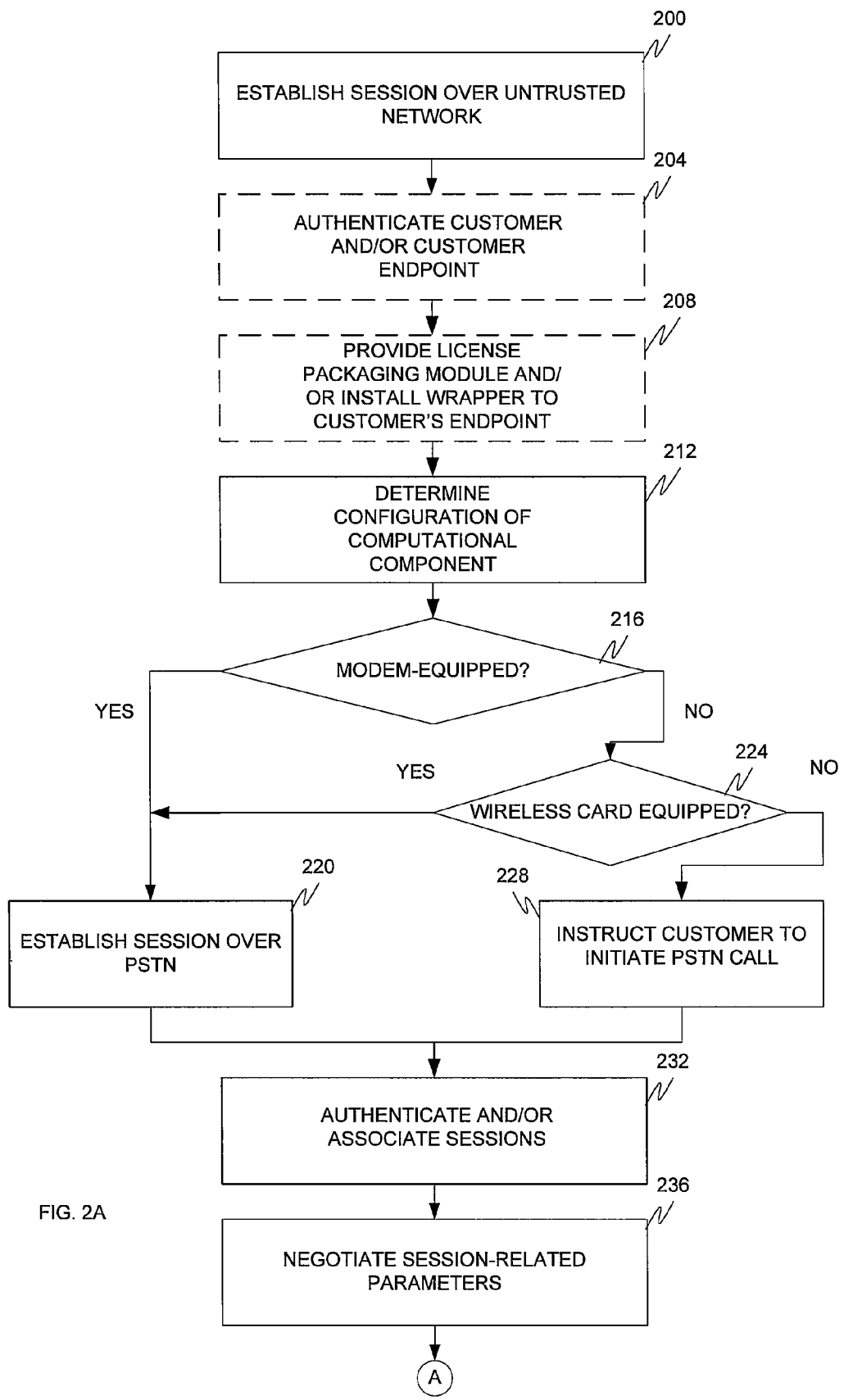
FIGS. 2A and B are collectively a flow chart according to an embodiment.

The operation of the various modules will now be described with reference to FIGS. 2A and B.

In step 200, the computational component 116 establishes a session, or second communication pathway, over the untrusted network 128. In one configuration, the component to be licensed is software and is purchased during the session. In another configuration, the session follows component purchase, whether in another session or from a store front retailer.

In optional step 204, the computational component 116 is authenticated by the licensing server 136. As will be appreciated, authentication may be performed in step 200 as part of session establishment. Authentication may involve exchange of payment information, such as via a Hypertext Transfer Protocol ("HTTP") Secure Sockets Layer ("SSL") session. In one configuration, payment information is exchanged, using the first and second communication pathways, after the first communication pathway is established. For example, the user's credit card number would be transferred over the more secure PSTN 112 than the untrusted network 128.

In optional step 208, the licensing server 136 provides the license packaging module 160 and/or install wrapper 164 to the computational component 116. In one configuration, one or both of the modules 160 and 164 is/are provided with the computational component 116 when purchased or on an external memory storage device containing purchased software to be licensed. In another configuration, the modules 160 and 164 in their entireties or in parts are provided over the first and second communication pathways of the different sessions. In this configuration, a first part of one or both of the modules is provided over the first communication pathway after a second part of one or both of the modules is provided over the second communication pathway.

In step 212, a processor in the computational component 116 executes part of the install wrapper by which it determines the configuration of the computational component 116. By this operation, the processor identifies configuration parameters, such as the presence of a modem, the presence of a wireless access card (such as a Subscriber Identification Module ("SIM") card), unused memory (random access memory) capacity, processor speed, and operating system specifications. For licensed software, compliance with system requirements can be critical to proper software execution.

In decision diamond 216, the processor in the computational component 116, while executing the install wrapper, determines whether or not the computational component 116 is equipped with a modem. When so equipped, the session coordination module 140, in step 220, establishes a communication session over the PSTN 112 using a modem protocol. When not so equipped, the processor proceeds to decision diamond 224.

In decision diamond 224, the processor, while executing the install wrapper, determines whether or not the computational component 116 is equipped with a wireless access card. When so equipped, the session coordination module 140 proceeds to step 220 and establishes a wireless (cellular) call over the PSTN 112. The install wrapper establishes the call by simulating dual tone multifrequency ("DTMF") signals over the telephony network 108. In one configuration, the dialed number is a number associated with a virtual terminal located in the vendor enterprise network. Calls to the virtual terminal are received by the licensing server 136. In another configuration, an identifier is included in a call set up signal to identify the call as a license-related call. In that event, the call is directed to the license server 136. When not equipped with a modem or wireless access card, the wrapper install module 164, in step 228, requests a user to manually dial the telephone address to initiate the session. In one configuration, the dialed number is a number associated with an Interactive Response Unit ("IRU"). Using a predetermined interactive logic, the IRU requests the user to input, via the keyboard on the computational component 116, information provided in subsequent steps by the licensing server 136 or, via a keypad on the calling voice communications device, information requested in subsequent steps by the licensing server 136.

In other configurations, the licensing server 136 determines whether the user has one or multiple duplexed lines for PSTN 112 and Internet connection. If the user has only a single line, it is not possible for both sessions to occur concurrently. In that event, the licensing server 136 causes sequential sessions to occur in which some licensing information is transmitted during one session, and, after termination of this session, the other session is established. Additional licensing information is then transmitted during the other session.

In step 232, the licensing server 136 optionally compares the calling number against license information in the licensing database 132 to confirm that the data address of the computational component 116 corresponds one-to-one with the calling number. This pairing typically is determined from a prior interaction with the computational component 116 or user or both. In one configuration, the user provides the telephone number associated with the component or customer enterprise network during the session over the untrusted network 128 in advance of the call. In another configuration, the license authority determines the corresponding telephone number (e.g., NANP and E.164) of the data address of the computational component 116. In another configuration, the user, using DTMF digits, inputs, by the telephone keypad, the IP address of the computational component 116, which is involved in the other session. This step prevents reuse of licensed software by other unlicensed persons. Other types of authentication may also be performed. For example, digital certificates of the computational component 116 and server 136 and/or symmetric or asymmetric keys may be exchanged over the first and/or second communication pathways. Public Key Infrastructure ("PKI") is preferred. PKI uses an asymmetric public and a private cryptographic key pair that is obtained and shared through a trusted authority. Authentication techniques using symmetric keys may also be employed. Voice authentication may also be performed over the first communication pathway by mapping the user's voice print against a voice print associated with the customer. A myriad of other communication techniques may be employed using the first communication pathway.

Also in step 232, the session coordination modules 140 in the licensing server 136 and computational component associate the incoming call on the first communication pathway with the other session on the second communication pathway. The address pairings permit the modules at each end of the first and second communication pathways to determine that any media arriving from a first phone number of a first endpoint and any media coming from a first IP address of the first endpoint are both coming from a common source and vice versa.

In step 236, session parameters are negotiated by the session coordination modules 140 for the first communication pathway. Although many session-related parameters may be negotiated in this step, the primary parameters negotiated respect what types of license information will be exchanged over the pathways. The type of information exchanged may depend on the discovered configuration of the computational component 116 (e.g. information exchanged over the first communication pathway when a modem or wireless access card is present will generally be different and greater than that exchanged when no modem or card is present) and/or a determined degree of trust associated with the user of the computational component 116 or the enterprise itself. When the user and/or enterprise has no prior licensing relationship with the vendor, that user and/or enterprise has a lower level of trust, from the viewpoint of the vendor, than when the user and/or enterprise has a prior licensing relationship with the vendor. Other session-related parameters that can be negotiated include media type to be supported in the session (e.g., audio, video, text, still images, animation, and interactivity content forms), encryption technique and parameters (e.g., key exchange, encryption algorithm or cipher, and digital signature), compression technique and parameters (e.g., codec specification and options), QoS parameters (e.g., jitter, latency, and packet loss), GoS parameters, specific communication pathways to be used, and network resource consumption (e.g., bandwidth required).

Figure 2B:
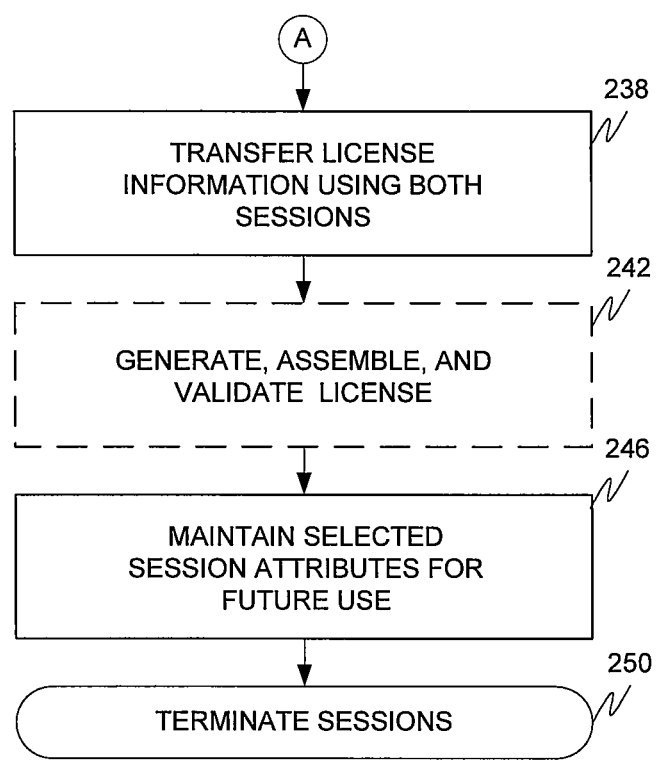

Referring now to FIG. 2B, the computational component 116 and licensing server 136, in step 238, exchange license information using both the first and second communication pathways. License information requiring a greater level of security, such as encryption keys, transient state information (to be used in key generation), or serial number(s) collected from the computational component 116, software activation keys (to activate licensed software and/or the install wrapper), license validation keys (to validate a license), a feature-based computation result, license validation queries and/or responses, license tracking information, and permissions to execute licensed software in a fixed or floating license scheme, and the like are transferred over the first communication pathway while information requiring a lower level of security is exchanged over the second communication pathway.

In one configuration, a first set of license fields is passed to the computational component 116 over the first communication pathway and a second (different) set of license fields is passed to the computational component 116 over the second communication pathway. For example, content is distributed via the Internet and coordination, distribution, management, and installation of certificates and/or licenses is done via the PSTN-based signaling channel. In another example, cryptographic combinations distributing part of the license and/or certificate via the Internet and part via the PSTN 112 are also possible. As will be appreciated, the two concurrent sessions over networks of differing trust levels permits an endless variety of combinations and permutations in effecting license-related transactions.

In step 242, which is performed when a new or updated license is being provided to the computational component 116, the license generation and validation module generates and transmits to the computational component 116 the fields for a license, and the license packaging module 160 assembles the fields into a license, which is stored in computer readable memory of the computational component 116. A license validation handshake with the license generation and validation module 154 confirms that the license has been assembled properly by the packaging module.

In step 246, the licensing server 136 updates the pertinent records, associated with the customer, in the licensing database 132. In this manner, selected session attributes and other information, such as license tracking information, are maintained current in the licensing database 132.

In step 250, the sessions are terminated.

As will be appreciated, the ordering of the steps is not critical. For example, the first communication pathway over the PSTN 112 may be established before the second communication pathway over the untrusted network 128. In another example, decision diamonds 216 and 224 are reversed so that a cellular call is established preferentially before a modem session.

When an enterprise server is positioned at either end of the call, the connection over the PSTN 112 may be kept alive and cached after the parties have ceased using the connection for control signaling. The persistency of this connection permits the connection to be used at different times by the same or other endpoints in the enterprise networks at each end of the connection. Caching the connections can reduce the time and processing resources needed to establish the connection.

The exemplary systems and methods of this invention have been described in relation to communication session coordination and management. To avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server or endpoint, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    establishing, over a first communication pathway, a first session between at least one of a customer and a customer computational component to be licensed and a licensing server, the first communication pathway being over a first network type comprising a digital telephone network;
    establishing, over a second communication pathway, a second session between the customer computational component to be licensed and the licensing server, the second communication pathway being over a second network type comprising an untrusted network, the second network type being different from the first network type;
    determining a configuration of the customer computational component to be licensed;
    based on the configuration of the customer computational component to be licensed, negotiating between the customer computational component to be licensed and the licensing server, at least one session parameter, the at least one session parameter indicating one or more types of licensing information that will be exchanged and specific communication pathways to be used;
    associating the first session on the first communication pathway with the second session on the second communication pathway, wherein signaling received over the first and second communication pathways is coordinated;
    determining that media arriving from the first session on the first communication pathway and media arriving from the second session on the second communication pathway are arriving from the same source;

transmitting, by a processor of the licensing server, first license information over the first communication pathway; and transmitting, by a processor of the licensing server, second license information over the second communication pathway, wherein the first and second license information permit the customer computational component to be licensed to execute.

2. The method of claim 1, wherein the first license information comprises at least one of session security information for the untrusted network and an encryption key and wherein the second license information comprises an encrypted license.

3. The method of claim 1, wherein the first license information comprises a digital certificate to authenticate the computational component and wherein the licensing server comprises a certificate authority.

4. The method of claim 1, wherein the first license information comprises at least one of transient state information of the computational component, a serial number collected from the customer computational component to be licensed, a software activation key to activate licensed software, a license validation key to validate the license, a feature-based computation result, a license validation query, a license validation response, license tracking information, a credit card number, and a permission to execute licensed software.

5. The method of claim 1, further comprising:
applying the following rules:
according to a first rule, when the customer computational component to be licensed comprises a modem, the first session is established using a modem protocol;
according to a second rule, when the customer computational component to be licensed comprises a wireless access card, the first session is established using a cellular telecommunications protocol; and
according to a third rule, when the customer computational component to be licensed comprises neither a modem nor a wireless access card, the first session is established by a customer manually dialing a telephone number associated with the licensing server.

6. The method of claim 1, further comprising:
associating, by a processor in the customer computational component to be licensed, a first calling number associated with the customer computational component to be licensed with a first IP address of the customer computational componentto be licensed;
associating, by a processor in the licensing server, a second calling number associated with the licensing server with a second IP address of the licensing server;
determining that media arriving from the first calling number associated with the customer computational component to be licensed and media arriving from the first IP address of the customer computational component to be licensed are arriving from a common computational component; and
determining that media arriving from the second calling number associated with the licensing server and media arriving from the second IP address of the licensing server are arriving from a common licensing server.

7. The method of claim 5, wherein the first license information is different when the first rule applies compared to when the third rule applies.

8. A non-transitory computer readable medium comprising processor executable instructions that, when executed, perform the method of claim 1.

9. A licensing server apparatus, comprising:
a processing device configured to:
establish, over a first communication pathway and by a first communication modality, a first session with at least one of a customer and a customer computational component to be licensed;
establish, over a second communication pathway and by a second communication modality, a second session with the customer computational component to be licensed, the network type of the second communication modality being different from the network type of the first communication modality;
based on a configuration of the customer computational component to be licensed, negotiate between the customer computational component to be licensed, at least one session parameter, the at least one session parameter indicating one or more types of licensing information that will be exchanged and specific communication pathways to be used;
associate, by a processor in the licensing server apparatus, the first session on the first communication pathway with the second session on the second communication pathway, wherein signaling received over the first and second communication pathways is coordinated;
determine that media arriving from the first session on the first communication pathway and media arriving from the second session on the second communication pathway are arriving from the same customer computational component to be licensed;
transmit and/or receive first license information over the first communication pathway; and
transmit and/or receive second license information over the second communication pathway, wherein the first and second license information permit the customer computational component to be licensed to execute.

10. The server of claim 9, wherein the first communication modality is a digital telephone network, wherein the second communication modality is an untrusted network, wherein the first license information comprises at least one of session security information for the untrusted network and an encryption key, and wherein the second license information comprises an encrypted license.

11. The server of claim 9, wherein the first license information comprises a digital certificate to authenticate the computational component and wherein the licensing server comprises a certificate authority.

12. The server of claim 9, wherein the first license information comprises at least one of transient state information of the computational component, a serial number collected from the computational component, a software activation key to activate licensed software, a license validation key to validate the license, a feature-based computation result, a license validation query, a license validation response, license tracking information, a credit card number, and a permission to execute licensed software.

13. The server of claim 9, wherein the first communication modality is a digital telephone network, wherein the second communication modality is the Internet, and wherein the processing device is further configured to:
apply the following rules:
according to a first rule, when the customer computational component to be licensed comprises a modem, establish the first session using a modem protocol;
according to a second rule, when the customer computational component to be licensed comprises a wireless access card, establish the first session using a cellular telecommunications protocol; and according to a third rule, when the customer computational component to be licensed comprises neither a modem nor a wireless access card, request the customer to establish the first session by manually dialing a telephone number associated with the licensing server.

14. The server of claim 9, wherein the processing device is further configured to:
associate a calling number associated with the customer computational component to be licensed with an IP address of the computational component; and
determine that media arriving from the calling number associated with the customer computational component to be licensed and media arriving from the IP address of the customer computational component to be licensed are arriving from a common computational component.

15. A computational component, comprising:
a software application to be licensed; and a processing device configured to:
establish, over a first communication pathway and by a first communication modality, a first session with a licensing server;
establish, over a second communication pathway and by a second communication modality, a second session with the licensing server, the network type of the second communication modality being different from the network type of the first communication modality;
determine a configuration of the computational component;
based on the configuration of the computational component, negotiate between the customer computational component and the licensing server, at least one session parameter, the at least one session parameter indicating one or more types of licensing information that will be exchanged and specific communication pathways to be used;
associate the first session on the first communication pathway with the second session on the second communication pathway, wherein signaling received over the first and second communication pathways is coordinated;
determine that media arriving from the first session on the first communication pathway and media arriving from the second session on the second communication pathway are arriving from the same source;
transmit and/or receive first license information over the first communication pathway; and
transmit and/or receive second license information over the second communication pathway, wherein the first and second license information permit the software application to execute.

16. The computational component of claim 15, wherein the first communication modality is a digital telephone network, wherein the second communication modality is an untrusted network, wherein the first license information comprises at least one of session security information for the untrusted network and an encryption key, and wherein the second license information comprises an encrypted license.

17. The computational component of claim 15, wherein the first license information comprises a digital certificate to authenticate the computational component and wherein the licensing server comprises a certificate authority.

18. The computational component of claim 15, wherein the first license information comprises at least one of transient state information of the computational component, a serial number collected from the computational component, a software activation key to activate licensed software, a license validation key to validate the license, a feature-based computation result, a license validation query, a license validation response, license tracking information, a credit card number, and a permission to execute licensed software.

19. The computational component of claim 15, wherein the first communication modality is a digital telephone network, wherein the second communication modality is the Internet, and wherein the processing device is further configured to:
apply the following rules:
according to a first rule, when the computational component comprises a modem, establish the first session using a modem protocol;
according to a second rule, when the computational component comprises a wireless access card, establish the first session using a cellular telecommunications protocol; and
according to a third rule, when the computational component comprises neither a modem nor a wireless access card, request the customer to establish the first session by manually dialing a telephone number associated with the licensing server.

20. The computational component of claim 15, wherein the processing device is further configured to:
associate a calling number associated with the licensing server with an IP address of the licensing server; and
determine that media arriving from the calling number associated with the licensing server and media arriving from the IP address of the licensing server are arriving from a common computational component.

* * * * *